US012689603B2

(12) United States Patent
Shah et al.

(10) Patent No.: US 12,689,603 B2
(45) Date of Patent: Jul. 21, 2026

(54) CONFIGURING A MONITOR MODE FOR SUSPICIOUS CONTENT IN EMAILS

(71) Applicant: SOPHOS LIMITED, Abingdon (GB)

(72) Inventors: Narendrakumar Jagadishkumar Shah, Ahmedabad (IN); Vivek Rudraduttbhai Yagnik, British Columbia (CA); Sumit Devshibhai Kakadiya, Ahmedabad (IN); John Mears, Carmarthen (GB); Tom Foucha, Southhaven, MS (US)

(73) Assignee: Sophos Limited, Abingdon (GB)

( * ) Notice: Subject to any disclaimer, the term of this patent is extended or adjusted under 35 U.S.C. 154(b) by 38 days.

(21) Appl. No.: 18/420,494

(22) Filed: Jan. 23, 2024

(65) Prior Publication Data

US 2025/0240258 A1 Jul. 24, 2025

(51) Int. Cl.
| | |
|---|---|
| *H04L 51/212* | (2022.01) |
| *H04L 9/40* | (2022.01) |
| *H04L 51/08* | (2022.01) |

(52) U.S. Cl.
CPC ............ *H04L 51/212* (2022.05); *H04L 51/08* (2013.01); *H04L 63/145* (2013.01); *H04L 63/1483* (2013.01)

(58) Field of Classification Search
CPC ..... H04L 51/212; H04L 41/214; H04L 51/08; H04L 63/145; H04L 63/1483; H04L 63/14; H04L 45/64; H04L 47/70; H04L 67/12; H04L 29/06; H04W 4/12
USPC .......................................................... 726/22
See application file for complete search history.

(56) References Cited

U.S. PATENT DOCUMENTS

| | | | | |
|---|---|---|---|---|
| 6,073,142 | A * | 6/2000 | Geiger | G06Q 10/107 709/204 |
| 7,568,008 | B2 * | 7/2009 | Jain | G06Q 10/107 709/206 |
| 7,761,498 | B2 | 7/2010 | Petry et al. | |
| 8,583,731 | B1 | 11/2013 | Jones | |
| 9,813,412 | B1 * | 11/2017 | Yang | H04L 63/145 |
| 10,372,931 | B2 * | 8/2019 | Rotem | H04L 63/0227 |

(Continued)

FOREIGN PATENT DOCUMENTS

| | | | | |
|---|---|---|---|---|
| EP | 3 382 971 | | 6/2021 | |
| EP | 3832971 | A1 * | 6/2021 | H04L 67/55 |

OTHER PUBLICATIONS

"Combined Search and Examination Report in GB Application No. 2500957.2", Jun. 10, 2025, 8 Pages.

*Primary Examiner* — Sargon N Nano
(74) *Attorney, Agent, or Firm* — IP Spring

(57) ABSTRACT

A computer-implemented method includes implementing, at a first computing system, a configuration of a routing journal rule and a connector to configure the first computing system to automatically send copies of inbound emails received at the first computing system to a second computing system that is distinct from the first computing system, wherein the second computing system includes a set of scanners operable to analyze the copies of the inbound emails to detect suspicious content. The method further includes receiving a notification of the suspicious content in a first email of the copies of inbound emails from the second computing system, wherein the notification is generated responsive to one or more of the set of scanners detecting at least the first email as including suspicious content.

20 Claims, 6 Drawing Sheets

600

Implement, at a first computing server, a configuration of a routing journal rule and a connector to configure the first computer server to automatically send copies of inbound emails received at the first computer server to a second computer server 602 where the second computer server is distinct from the first computer server where the second computer server includes a set of scanners operable to analyze the copies of the inbound emails to detect suspicious content Receive a notification of the suspicious content in a first email of the copies of inbound emails from the second computer server, where the notification is generated responsive to one or more of the set of scanners detecting at least the first email as including suspicious content 604

(56) References Cited

U.S. PATENT DOCUMENTS

| | | | | |
|---|---|---|---|---|
| 11,025,651 | B2 * | 6/2021 | AlGarawi | H04L 63/1416 |
| 11,368,475 | B1 * | 6/2022 | Vashisht | G06F 16/9535 |
| 11,477,222 | B2 * | 10/2022 | Dunn | H04L 63/1425 |
| 11,966,469 | B2 * | 4/2024 | Lee | H04L 51/212 |
| 12,166,797 | B2 * | 12/2024 | Annapureddy | H04L 63/1483 |
| 2006/0174033 | A1 * | 8/2006 | Gillum | H04L 51/214 |
| | | | | 709/206 |
| 2007/0033283 | A1 * | 2/2007 | Brown | H04L 63/20 |
| | | | | 709/226 |
| 2013/0117809 | A1 * | 5/2013 | McDougal | G06F 21/567 |
| | | | | 726/1 |
| 2019/0028509 | A1 * | 1/2019 | Cidon | H04L 63/1425 |
| 2021/0168161 | A1 * | 6/2021 | Dunn | H04L 51/212 |
| 2021/0176272 | A1 * | 6/2021 | Maha | H04W 4/12 |
| 2021/0273976 | A1 * | 9/2021 | Reiser | H04L 63/1425 |
| 2021/0281586 | A1 * | 9/2021 | Rasmussen | H04L 63/1466 |
| 2023/0007042 | A1 * | 1/2023 | Haworth | H04L 63/205 |
| 2023/0319065 | A1 * | 10/2023 | Mears | H04L 51/212 |
| | | | | 726/23 |

* cited by examiner

NOTE: S = Security Agent

200

218

Memory <u>237</u>

Security Application <u>103</u>

224

Processor
<u>235</u>

222

I/O Interface
<u>239</u>

226

228

230

Display
<u>241</u>

Datastore
<u>243</u>

300

Customer email server
310

Security
Application
103

Email security
server
320

Copies of emails

Deliver outbound emails

Send emails

305

315

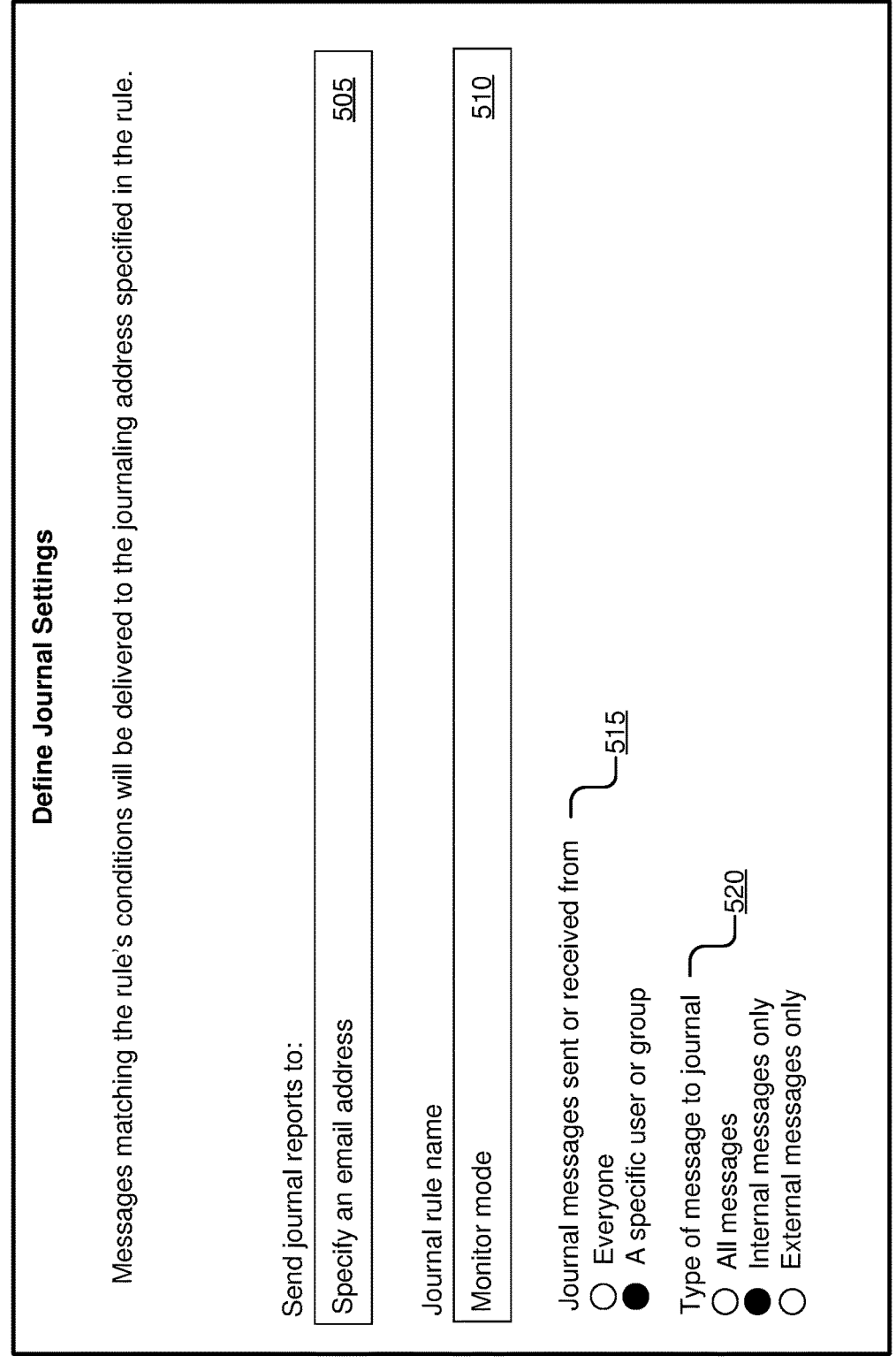

Define Journal Settings

Messages matching the rule's conditions will be delivered to the journaling address specified in the rule.

Send journal reports to:

| Specify an email address | 505 |

Journal rule name

| Monitor mode | 510 |

Journal messages sent or received from   515
- ○ Everyone
- ● A specific user or group Type of message to journal   520
- ○ All messages
- ● Internal messages only
- ○ External messages only

Implement, at a first computing server, a configuration of a routing journal rule and a connector to configure the first computer server to automatically send copies of inbound emails received at the first computer server to a second computer server 602 where the second computer server is distinct from the first computer server where the second computer server includes a set of scanners operable to analyze the copies of the inbound emails to detect suspicious content Receive a notification of the suspicious content in a first email of the copies of inbound emails from the second computer server, where the notification is generated responsive to one or more of the set of scanners detecting at least the first email as including suspicious content 604

FIG 6

CONFIGURING A MONITOR MODE FOR SUSPICIOUS CONTENT IN EMAILS

FIELD

Embodiments relate generally to routing inbound emails from a first computing system to a second computing system. More particularly, embodiments relate to methods, systems, and computer-readable media that implement a configuration of a routing journal rule and a connector to configure a first computing system to automatically send copies of inbound emails to a second computing system and receive notifications of suspicious content.

BACKGROUND

Email security servers process a customer's inbound and outbound email with email scanners that detect different kinds of undesirable content. The email security servers prevent customers from receiving inbound emails and/or from transmitting outbound emails based on rules associated with a particular policy. For example, the email security servers may prevent customers from receiving emails with malware and prevent the customers from transmitting emails with disclosure of confidential company information.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method includes implementing, at a first computing system, a configuration of a routing journal rule and a connector to configure the first computing system to automatically send copies of inbound emails received at the first computing system to a second computing system that is distinct from the first computing system, where the second computing system includes a set of scanners operable to analyze the copies of the inbound emails to detect suspicious content. The method also includes receiving a notification of the suspicious content in a first email of the copies of inbound emails from the second computing system, wherein the notification is generated responsive to one or more of the set of scanners detecting at least the first email as including suspicious content.

In some embodiments, the second computing system is specific to the first computing system and the second computing system includes an address associated with the first computing system in its network name. In some embodiments, the configuration causes the first computing system to exclude at least one inbound email from inbound emails received at the first computing system from the copies being provided to the second computing system, based on a set of rules. In some embodiments, the copies include an additional header that includes information about the routing journal rule.

In some embodiments, the second computing system is configured to receive copies of outbound emails generated by a user and analyze the copies of the outbound emails for suspicious content, and the method further includes receiving a notification of the suspicious content in one of the outbound emails from the second computing system, wherein the notification is generated responsive to one or more of the set of scanners detecting at least a second email of the copies of outbound emails as including suspicious content. In some embodiments, the configuration of the routing journal rule includes one or more options selected from the group of: specifying an email address that receives the copies of the inbound emails, specifying the email address that receives the copies of the outbound emails, specifying a sender of the inbound emails, specifying a type of message to receive, and combinations thereof. In some embodiments, delivery of the inbound emails is unaffected by sending copies of the inbound emails to the second computing system. In some embodiments, the second computing system is configured to receive copies of internal emails generated by a user and analyze the copies of the internal emails for suspicious content, and the method further includes receiving a notification of the suspicious content in one of the internal emails from the second computing system, wherein the notification is generated responsive to one or more of the set of scanners detecting at least a second email of the copies of internal emails as including suspicious content.

In some embodiments, the method further includes receiving a request to implement an active mode that prevents delivery of a set of inbound emails with suspicious content and implementing, at the first computing system, the configuration of the routing journal rule and the connector to configure the first computing system to automatically to send the inbound emails to the set of scanners before delivering the inbound emails to the first computing system. In some embodiments, the configuration further causes the first computing system to withhold delivery of the inbound emails, until receiving the notification, and the method further comprises if the notification indicates no suspicious content or permitted suspicious content, delivering the first email to a recipient inbox and if the notification indicates non-permitted suspicious content, withholding delivery of the at least the first email to the recipient inbox and sending an alert to an administrator of the first computing system.

In some embodiments, implementing the configuration to the routing journal rule and the connector includes modifying an Elastic Load Balancing (ELB) record or a Domain Name System (DNS) Mail Exchange (MX) record. In some embodiments, notifying the first computing system of the suspicious content includes generating a report that summarizes the copies of the inbound emails during a particular time period, wherein the report includes one or more features selected from the group of an inbound email history, an inbound email summary, a description of suspicious files included in the copies of the inbound emails, a risk summary, a data loss prevention summary, a license summary, and combinations thereof. In some embodiments, the method further includes determining a threat level associated with an instance of suspicious content in the first email and responsive to the threat level exceeding a threshold threat level, removing the first email from an email inbox associated with a recipient of the first email.

A first computing system comprises one or more processors and one or more computer-readable media, having instructions stored thereon that, when executed by the one or more processors, cause the one or more processors to perform operations comprising: implementing a configuration of a routing journal rule and a connector to configure the first computing system to automatically send copies of inbound emails received at the first computing system to a second computing system that is distinct from the first computing system, wherein the second computing system includes a set of scanners operable to analyze the copies of the inbound emails to detect suspicious content and receiving a notification of the suspicious content in a first email of the copies of inbound emails from the second computing system, wherein the notification is generated responsive to one or more of the set of scanners detecting at least the first email as including suspicious content.

In some embodiments, the second computing system is specific to the first computing system and includes an address associated with the first computing system in its network name. In some embodiments, the second computing system is configured to receive copies of outbound emails generated by a user and analyze the copies of the outbound emails for suspicious content, and the operations further include receiving a notification of the suspicious content in one of the outbound emails from the second computing system, wherein the notification is generated responsive to one or more of the set of scanners detecting at least a first email of the copies of outbound emails as including suspicious content.

A non-transitory computer-readable medium with instructions stored thereon that, responsive to execution by a processing device, causes the processing device to perform operations comprising: implementing, at a first computing system, a configuration of a routing journal rule and a connector to configure the first computing system to automatically send copies of inbound emails received at the first computing system to a second computing system that is distinct from the first computing system, wherein the second computing system includes a set of scanners operable to analyze the copies of the inbound emails to detect suspicious content and receiving a notification of the suspicious content in a first email of the copies of inbound emails from the second computing system, wherein the notification is generated responsive to one or more of the set of scanners detecting at least the first email as including suspicious content.

In some embodiments, the second computing system is specific to the first computing system and includes an address associated with the first computing system in its network name. In some embodiments, the second computing system is configured to receive copies of outbound emails generated by a user and analyze the copies of the outbound emails for suspicious content and the operations further include receiving a notification of the suspicious content in one of the outbound emails from the second computing system, wherein the notification is generated responsive to one or more of the set of scanners detecting at least a first email of the copies of outbound emails as including suspicious content. In some embodiments, the operations further include receiving a request to implement an active mode that prevents delivery of a set of inbound emails with suspicious content and implementing, at the first computing system, the configuration of the routing journal rule and the connector to configure the first computing system to automatically to send the inbound emails to the set of scanners before delivering the inbound emails to the custom email server.

BRIEF DESCRIPTION OF THE DRAWINGS

FIG. 5 is an example user interface for configuring journal settings, according to some embodiments described herein.

FIG. 6 is a flow diagram of an example method to configure a routing journal and a connector to automatically send copies of inbound emails to a computing system, according to some embodiments described herein.

DETAILED DESCRIPTION

Email security servers process a customer's inbound and outbound email through a set of scanners. The scanners detect different types of suspicious content, such as spam emails, malware, inclusion of confidential information, etc. The email security servers may withhold delivery of emails based on the types of suspicious content and the threat level.

A customer may be interested in testing out different types of email security services but may not want to commit to an email security service by having their emails withheld until the emails are scanned by the email security servers. The technology described below advantageously solves the problem by creating a monitor mode.

A routing journal rule and a connector may be configured so that a customer email server automatically sends copies of inbound emails received at the customer email server to an email security server. For example, the configuration may include modifying an elastic load balancing record or a domain name system mail exchange record.

The email security server incudes a set of scanners that analyze the copies of the inbound emails to detect suspicious content. The customer email server receives a notification of suspicious content from the email security server in response to the set of scanners detecting suspicious content in one or more emails. In some embodiments, the notification may include a report of a series of inbound emails that summarizes different issues detected in the inbound emails. The analysis may also be expanded to include outbound emails.

The customer may decide, based on the monitor mode, that the customer wants to use the email security service. As a result, the customer email server may receive a request to switch from monitor mode to active mode and, as a result, may implement the configuration of the routing journal rule and the connector to send the inbound emails to the set of scanners before delivering the inbound emails.

Threat Management System 100

Figure 1:
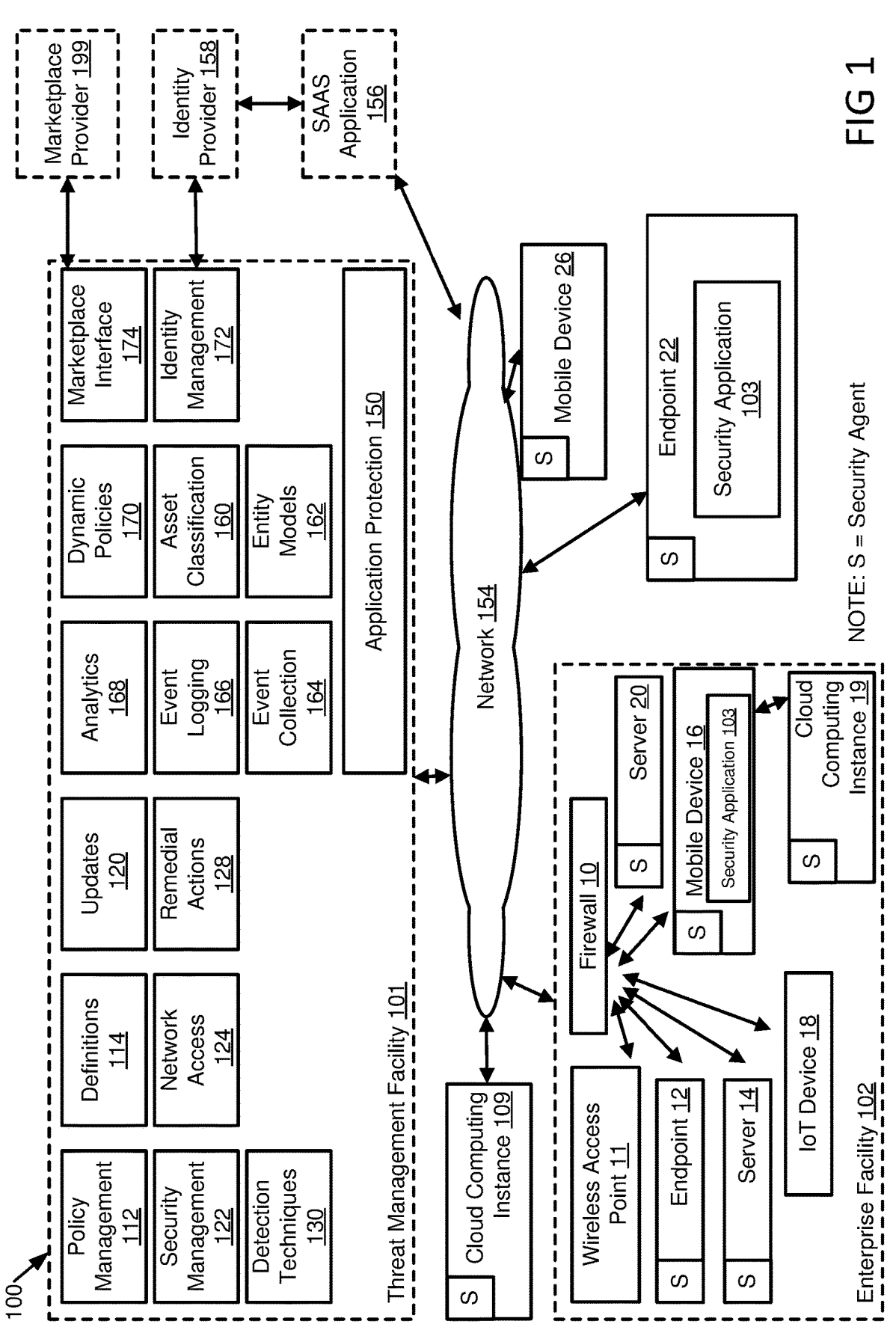
FIG. 1 depicts a block diagram of a threat management system, according to some embodiments described herein.

FIG. 1 depicts a block diagram of a threat management system 100 providing protection against a plurality of threats, such as malware, viruses, spyware, cryptoware, adware, ransomware, trojans, spam, intrusion, policy abuse, improper configuration, vulnerabilities, improper access, uncontrolled access, and more. A threat management facility or network monitor 100 may communicate with, coordinate, and control operation of security functionality at different control points, layers, and levels within the system 100. A number of capabilities may be provided by the threat management facility 101, with an overall goal to intelligently monitor network traffic from endpoints/hosts to known security product update sites. The threat management facility 101 can monitor the traffic passively and analyze the traffic. The threat management facility 101 may be or may include a gateway such as a web security appliance that is actively routing and/or assessing the network requests for security purposes. Another overall goal is to provide protection needed by an organization that is dynamic and able to adapt to changes in compute instances and new threats due to personal or unmanaged devices using the enterprise network. According to various aspects, the threat management facility 101 may provide protection from a variety of threats to a variety of compute instances in a variety of locations and network configurations.

As one example, users of the threat management facility 101 may define and enforce policies that control access to and use of compute instances, networks, and data. Administrators may update policies such as by designating authorized users and conditions for use and access. The threat management facility 101 may update and enforce those policies at various levels of control that are available, such as by directing compute instances to control the network traffic that is allowed to traverse firewalls and wireless access points, applications, and data available from servers, applications, and data permitted to be accessed by endpoints, and network resources and data permitted to be run and used by endpoints. The threat management facility 101 may provide many different services, and policy management may be offered as one of the services.

Turning to a description of certain capabilities and components of the threat management system 100, an example enterprise facility 102 may be or may include any networked computer-based infrastructure. For example, the enterprise facility 102 may be corporate, commercial, organizational, educational, governmental, or the like. As home networks can also include more compute instances at home and in the cloud, an enterprise facility 102 may also or instead include a personal network such as a home or a group of homes. The enterprise facility's 102 computer network may be distributed amongst a plurality of physical premises, such as buildings on a campus, and located in one or in a plurality of geographical locations. The configuration of the enterprise facility as shown as one example, and it will be understood that there may be any number of compute instances, less or more of each type of compute instances, and other types of compute instances.

As shown, the example enterprise facility includes a firewall 10, a wireless access point 11, an endpoint 12, a server 14, a mobile device 16, an appliance or Internet-of-Things (IoT) device 18, a cloud computing instance 19, and a server 20. One or more of 10-20 may be implemented in hardware (e.g., a hardware firewall, a hardware wireless access point, a hardware mobile device, a hardware IoT device, a hardware etc.) or in software (e.g., a virtual machine configured as a server or firewall or mobile device). While FIG. 1 shows various elements 10-20, these are for example only, and there may be any number or types of elements in a given enterprise facility. For example, in addition to the elements depicted in the enterprise facility 102, there may be one or more gateways, bridges, wired networks, wireless networks, virtual private networks, virtual machines or compute instances, computers, and so on.

The threat management facility 101 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 101 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In various implementations, a marketplace provider 199 may make available one or more additional facilities to the enterprise facility 102 via the threat management facility 101. The marketplace provider may communicate with the threat management facility 101 via the marketplace interface facility 174 to provide additional functionality or capabilities to the threat management facility 101 and compute instances 10-26. As examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122. According to some implementations, the marketplace provider 199 is a trusted security vendor that can provide one or more security software products to any of the compute instances described herein. In this manner, the marketplace provider 199 may include a plurality of trusted security vendors that are used by one or more of the illustrated compute instances.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

The identity provider 158 may provide user identity information, such as multi-factor authentication, to a software-as-a-service (SaaS) application. Centralized identity providers may be used by an enterprise facility instead of maintaining separate identity information for each application or group of applications, and as a centralized point for integrating multifactor authentication. The identity management facility 172 may communicate hygiene, or security risk information, to the identity provider 158. The identity management facility 172 may determine a risk score for a particular user based on events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

The threat protection provided by the threat management facility 101 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth. In some implementations, the endpoint 22 and/or the mobile device 26 include a security application 103 that is discussed in greater detail below.

In some implementations, compute instances 10-26 may communicate with cloud applications, such as SaaS application 156. The SaaS application 156 may be an application that is used by but not operated by the enterprise facility 102. Example commercially available SaaS applications 156 include Salesforce, Amazon Web Services (AWS) applications, Google Apps applications, Microsoft Office 365 applications, and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

Aspects of the threat management facility 101 may be provided as a stand-alone solution. In other implementations, aspects of the threat management facility 101 may be integrated into a third-party product. An application programming interface (e.g., a source code interface) may be provided such that aspects of the threat management facility 101 may be integrated into or used by or with other applications. For instance, the threat management facility 101 may be stand-alone in that it provides direct threat protection to an enterprise or computer resource, where protection is subscribed to directly. Alternatively, the threat management facility may offer protection indirectly, through a third-party product, where an enterprise may subscribe to services through the third-party product, and threat protection to the enterprise may be provided by the threat management facility 101 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In some implementations, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an implementation, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an implementation, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, uniform resource identifier (URI) filtering, and the like. Aspects of the web security and control may be provided, for example, in the security agent of an endpoint 12, in a wireless access point 11 or firewall 10, as part of application protection 150 provided by the cloud, and so on.

According to one implementation, the security management facility 122 may provide for network monitoring and access control, which generally controls access to and use of network connections, while also allowing for monitoring as described herein. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. According to various implementations, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 101 or other network resource(s).

The security management facility 122 may also provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

The security management facility 122 may provide also for reputation filtering, which may target or identify sources of known malware. For instance, reputation filtering may include lists of URIs of known sources of malware or known suspicious internet protocol (IP) addresses, code authors, code signers, or domains, that when detected may invoke an action by the threat management facility 101. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In some implementations, some reputation information may be stored on a compute instance 10-26, and other reputation data available through cloud lookups to an application protection lookup database, such as may be provided by application protection 150.

In some implementations, information may be sent from the enterprise facility 102 to a third party, such as a security vendor, or the like, which may lead to improved performance of the threat management facility 101. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. Feedback may enable the evaluation or profiling of client actions that are violations of policy that may provide a predictive model for the improvement of enterprise policies as well as detection of emerging security threats.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In some implementations, updates may be provided to the enterprise facility's 102 network, where one or more compute instances on the enterprise facility's 102 network may distribute updates to other compute instances.

According to some implementations, network traffic associated with the update facility functions may be monitored to determine that personal devices and/or unmanaged devices are appropriately applying security updates. In this manner, even unmanaged devices may be monitored to determine that appropriate security patches, software patches, virus definitions, and other similar code portions are appropriately updated on the unmanaged devices.

The threat management facility 101 may include a policy management facility 112 that manages rules or policies for the enterprise facility 102. Example rules include access permissions associated with networks, applications, compute instances, users, content, data, and the like. The policy management facility 112 may use a database, a text file, other data store, or a combination to store policies. A policy database may include a block list, a black list, an allowed list, a white list, and more. As non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Example policies may be defined for an enterprise facility, application type, subset of application capabilities, organization hierarchy, compute instance type, user type, network location, time of day, connection type, or any other suitable definition. Policies may be maintained through the threat management facility 101, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In one implementation, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

The threat management facility 101 may provide configuration management as an aspect of the policy management facility 112, the security management facility 122, or a combination thereof. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of uniform serial bus (USB) disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

The policy management facility 112 may also require update management (e.g., as provided by the update facility 120). Update management for the security facility 122 and policy management facility 112 may be provided directly by the threat management facility 101, or, for example, by a hosted system. In some implementations, the threat management facility 101 may also provide for patch management, where a patch may be an update to an operating system, an application, a system tool, or the like, where one of the reasons for the patch is to reduce vulnerability to threats.

In some implementations, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In one implementation, the policy management facility 112 and the security facility 122 may work in concert with the update management facility 120 to provide information to the enterprise facility's 102 network and/or compute instances 10-26. In various implementations, policy updates, security updates, and other updates may be provided by the same or different modules, which may be the same or separate from a security agent running on one of the compute instances 10-26. Furthermore, the policy updates, security updates, and other updates may be monitored through network traffic to determine if endpoints or compute instances 10-26 correctly receive the associated updates.

As threats are identified and characterized, the definition facility 114 of the threat management facility 101 may manage definitions used to detect and remediate threats. For example, identity definitions may be used for recognizing features of known or potentially malicious code and/or known or potentially malicious network activity. Definitions also may include, for example, code or data to be used in a classifier, such as a neural network or other classifier that may be trained using machine learning. Updated code or data may be used by the classifier to classify threats. In some implementations, the threat management facility 101 and the compute instances 10-26 may be provided with new definitions periodically to include most recent threats. Updating of definitions may be managed by the update facility 120 and may be performed upon request from one of the compute instances 10-26, upon a push, or some combination. Updates may be performed at a specific a time period, on demand from a device 10-26, upon determination of an important new definition or a number of definitions, and so on.

A threat research facility (not shown) may provide a continuously ongoing effort to maintain the threat protection capabilities of the threat management facility 101 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 101 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need-to-know data, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In some implementations, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 101 may include an asset classification facility 160. The asset classification facility will discover the assets present in the enterprise facility 102.

A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, IOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that are accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An example event may be communication of a specific packet over the network. Another example event may be identification of an application that is communicating over a network. These and other events may be used to determine that a particular endpoint includes or does not include actively updated security software from a trusted vendor.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility 122. Observations or inferences about events may also be logged by the event logging facility 166.

When a threat or other policy violation is detected by the security management facility 122, the remedial action facility 128 may be used to remediate the threat. Remedial action may take a variety of forms, including collecting additional data about the threat, terminating or modifying an ongoing process or interaction, sending a warning to a user or administrator from an IT department, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Computing Device 200

Figure 2:
FIG. 2 is a blocking diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In some embodiments, computing device 200 is part of the enterprise facility 102 in FIG. 1. For example, the computing device may be the mobile device 16, the server 13, the server 20, etc. In some embodiments, the computing device 200 is the endpoint 22 illustrated in FIG. 1.

In some embodiments, computing device 200 includes a processor 235, a memory 237, an input/output (I/O) interface 239, a display 241, and a datastore 243, all coupled via a bus 218. The processor 235 may be coupled to the bus 218 via signal line 222, the memory 237 may be coupled to the bus 218 via signal line 224, the I/O interface 239 may be coupled to the bus 218 via signal line 226, the display 241 may be coupled to the bus 218 via signal line 228, and the datastore 243 may be coupled to the bus 218 via signal line 230.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200.

The memory 237 may be a computer-readable media that stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the security application 103, which is described in greater detail below.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or datastore 243), and input/output devices can communicate via I/O interface 239. In another example, the I/O interface 239 can receive data, such as email messages, from a user device 115 and deliver the data to the security application 103. In some embodiments, the I/O interface 239 can connect to interface devices such as input devices (keyboard, pointing device, touchscreen, microphone, camera, scanner, sensors, etc.) and/or output devices (display devices, speaker devices, printers, monitors, etc.).

Some examples of interfaced devices that can connect to I/O interface 239 can include a display 241 that can be used to display content, e.g., an email message received from the sender. The display 241 can include any suitable display device such as a liquid crystal display (LCD), light emitting diode (LED), or plasma display screen, cathode ray tube (CRT), television, monitor, touchscreen, three-dimensional display screen, or other visual display device.

The datastore 243 may store data related to the security application 103. For example, the datastore 243 may store, with user permission, emails, corresponding determinations from the set of scanners, approvals from users of particular roles, content identifiers and corresponding true or false designations, etc. The datastore 243 may be coupled to the bus 218 via signal line 230.

In some embodiments, one or more components of the computing device 200 may not be present depending on the type of computing device 200. For example, if the computing device 200 is a server, the computing device 200 may not include the display 241.

FIG. 2 illustrates a computing device 200 that executes an example security application 103 stored in memory 237 of the computing device 200. The security application 103 implements a configuration of a routing journal rule and a connector to configure the security application 103 to automatically send copies of inbound emails received at the security application 103 to a computing system that is distinct from the security application 103 stored on the computing device 200, wherein the computing system includes a set of scanners operable to analyze the copies of the inbound emails to detect suspicious content. The security application 103 receives a notification of the suspicious content in a first email of the copies of inbound emails from the computing system, where the notification is generated responsive to one or more of the set of scanners detecting at least the first email as including suspicious content.

Computing Environment 300

Figure 3:
FIG. 3 is a block diagram of an example computing environment, according to some embodiments described herein.

FIG. 3 is a block diagram of an example computing environment 300. In some embodiments, the computing environment 300 includes external users 305, a customer email server 310 (also known as a first computing system), an email security server 320 (also known as a second computing system), and internal users 315.

The customer email server 310 may be part of the enterprise facility 102 illustrated in FIG. 1. In one embodiment, an internal user 315 is a user that is registered and/or authorized to access resources (e.g., applications, files, etc.) provided by the customer email server 310. In another embodiment, internal users 315 are users that are affiliated with the same organization and use a similar or identical domain in their email addresses.

During monitor mode, a routing journal rule and a connector at the customer email server 310 are configured to automatically send copies of emails received at the customer email server 310 to the email security server 320. For example, the configuration may include modifying an Elastic Load Balancing (ELB) record or a Domain Name System (DNS) Mail Exchange (MX) record. The email security server 320 may be specific to the customer email server 310 and include an address associated with the customer email server 310 in its network name. In some embodiments, a customer identifier may be used as a subdomain.

In some embodiments, some inbound emails may be excluded from copies being provided to the email security server 320. For example, a customer may already have security software that sufficiently identifies spam emails and is using the monitor mode to test out whether the security application 103 is useful for identifying malware. In another example, an email application may already block receipt of emails from particular senders and, as a result, those emails have copies that are excluded from being provided to the email security server 320. The customer may be able to specify a type of email that is excluded from copies being provided to the email security server.

An external user 305 may send an email to an internal user 315 via a security application 103 that is stored on the customer email server 310. While the security application 103 is configured for monitor mode, the security application 103 transmits the email to the internal user 315 while also sending a copy to the email security server 320 and thus, delivery of the email is unaffected by sending a copy of the email to the email security server 320. In some embodiments, the security application 103 modifies the copy of the email to include an additional header that includes information about the routing journal rule. In some embodiments, an internal user 315 sends an email (e.g., an internal email) to an internal user 315 via the security application 103 and a copy of the email is transmitted to the email security server 320.

The email security server 320 may include a set of scanners that determine whether the email has suspicious content. For example, the scanners can include automated scanning software (and/or hardware) that is configured to analyze the email content (e.g., email headers, metadata, email content, email attachments, etc.) and provide a verdict.

In some embodiments, the set of scanners scan email messages for content and extract features from the email messages. Feature extraction is an automated process using one or more techniques such as text analysis, image analysis, video analysis, or other techniques to extract features from email content and/or metadata. Feature extraction is performed with user permission. Feature extraction can be performed using any suitable techniques such as machine learning, heuristics, pattern matching, hashing, etc.

In some embodiments, one or more scanners in the set of scanners are associated with a respective type of content and are configured to detect whether the email includes the respective type of content responsive to performing feature extraction. In some embodiments, the one or more scanners perform feature extraction by extracting metadata including identifying a sender, a recipient, an envelope, a header, etc. In some embodiments, the one or more scanners extract raw per-email data that includes identity vectors for the sender and all intermediate relays (public and private), Autonomous System Numbers (ASN), DNS hosting, and sender and intermediary authentication results.

Each scanner may apply different types of detection rules based on the type of content. In some embodiments, a scanner provides a verdict based on multiple factors, such as content of an email, senders and recipients of the email, a time of day, a reputation and history of emails relating to the sender and/or the recipient, metadata including a sender server or originating internet protocol (IP) address, and/or intermediate relay servers. A scanner may use any combination of whitelists, blacklists, machine learning, historical analysis, heuristics, pattern matching, etc. to analyze whether the email includes suspicious content for the respective type of content. For example, a first scanner may detect that inbound emails include innocuous spam. A second scanner may detect that inbound emails include malicious content, such as a virus, malicious spam, a malicious URL, a spoofed sender, etc. A third scanner may detect that outbound emails include company confidential information. A fourth scanner may detect that that inbound emails and/or outbound emails contain personally identifiable information. A fifth scanner may detect that inbound emails and/or outbound emails contain offensive language. Other numbers and types of scanners may be used.

In some embodiments, one or more of the scanners may be associated with multiple types of content, and may provide respective verdicts. For example, a particular scanner may be configured to provide verdicts regarding whether an email includes confidential content of an organization, whether the email includes content that violates organizational policy (e.g., offensive content), and whether the email has a recipient that violates organizational policy (e.g., an unauthorized recipient). In another example, a particular scanner that scans text content may be configured to provide verdicts regarding whether the email text is malicious (e.g., includes phishing text, includes hyperlinks that are inauthentic, etc.) or suspicious (e.g., based on spelling errors, use of special characters, etc. in the body of the email). In some embodiments, one or more scanners determine a threat level associated with the email. For example, an email may have a low threat level if the email is possibly spam, but a high threat level if the email includes a phishing attempt or malicious links.

The number of scanners and the types of content reviewed by the scanners are dictated by a policy. The policy may include default settings that are associated with the security application 103 or the policy may be configured by a company or organization, for example, by an administrator as discussed in greater detail with reference to the policy management facility 112 illustrated in FIG. 1. In some embodiments, scanners generate a confidence score for each type of content that indicates a level of confidence in the problematic nature of the type of content. For example, for a scanner that identifies types of offensive content, the scanner may determine that the language is offensive based on types of words used and frequency and assign a confidence score 98 out of 100.

The security application 103 receives a notification of the suspicious content in the email from the email security server 320 based on the verdicts. For example, the notification may identify the type of suspicious content in the email and the types of actions that the security application 103 would perform if the security application 103 was set to an active mode instead of the monitor mode.

This process is performed for multiple emails that are received from external users 305. In some embodiments, the process may also be performed for outbound emails. For example, an internal user 315 may provide an outbound email to the security application 103. The security application 103 may send a copy of the outbound email to the email security server 320 while also delivering the outbound email to the external user 305. The security application 103 may receive a notification from the email security server 320 that the outbound email includes suspicious content and the security application 103 may provide the notification to the internal user 315.

In some embodiments, the notification includes a report that summarizes the copies of the emails during a particular time period. The emails may include both inbound emails and outbound emails. The report may include an email history, an email summary, a description of suspicious files included in the copies of the emails, a risk summary, a data loss prevention summary, and/or a license summary. The report advantageously provides internal users 315 with information about how the set of scanners identified suspicious content and types of actions that the set of scanners would take if the security application 103 was in active mode.

In some embodiments, while in monitor mode the security application 103 prevents the delivery of emails with suspicious content based on a threat level or a type of suspicious content. For example, the routing journal rule and the connector may be configured so that the security application 103 withholds delivery of emails until the security application 103 receives the notification. If the notification indicates no suspicious content or permitted suspicious content, the security application 103 may deliver the email to an internal user 315. If the notification indicates that the email includes non-permitted suspicious content, the security application 103 may withhold delivery of the email to the recipient and send an alert to an administrator associated with the security application 103.

In another example, the security application 103 may determine a threat level associated with an instance of suspicious content in an email and, responsive to a threat level exceeding a threshold threat level, the security application 103 may remove the email from an email inbox associated with an internal user 315 that is a recipient of the email.

In some embodiments, a customer may decide to switch from the monitor mode to an active mode. The security application 103 receives a request to implement an active mode that prevents delivery of a set of inbound emails with suspicious content. The security application 103 also implements the configuration of the routing journal rule and the connector to configure the security application 103 to automatically send the inbound emails to the set of scanners stored on the email security server 320 before delivering the inbound emails to the customer email server 310.

Figure 4:
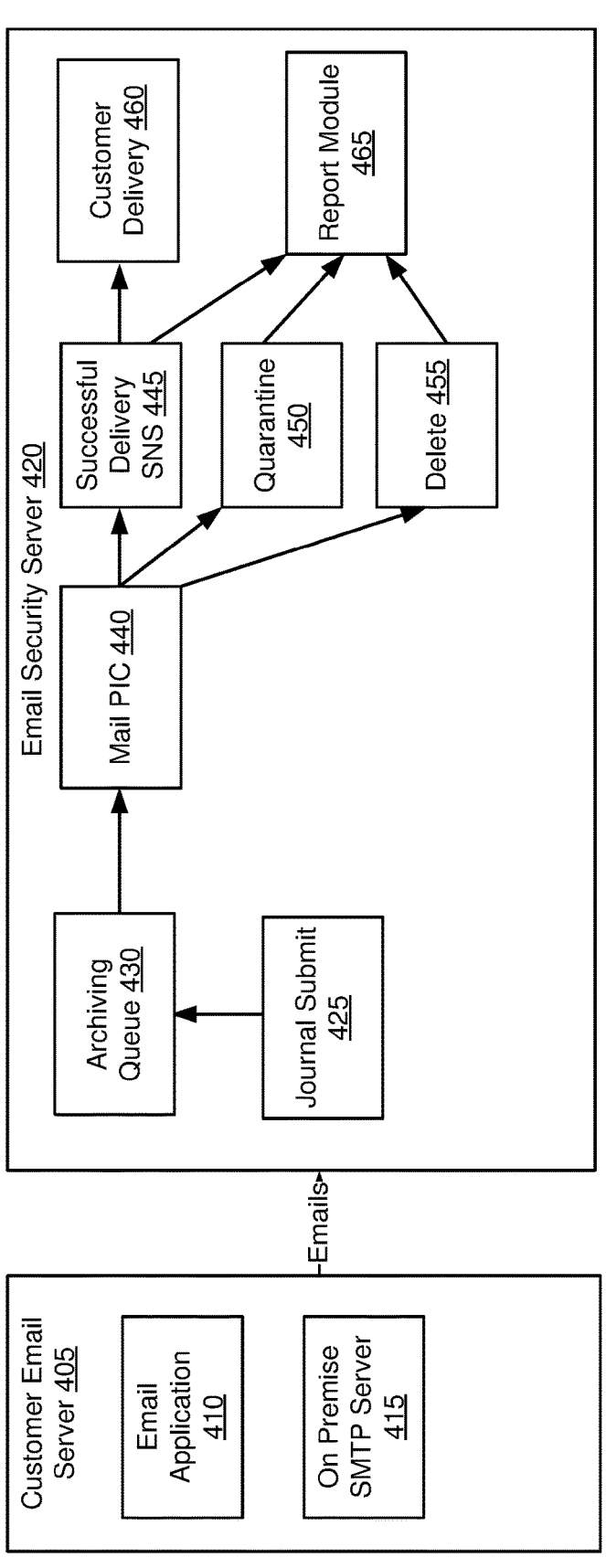
FIG. 4 is a block diagram of an example custom email server and an example email security server, according to some embodiments described herein.

FIG. 4 is a block diagram 400 of an example custom email server 405 and an example email security server 420.

The customer email server 405 may include an email application 410 and an on premise simple mail transfer protocol (SMTP) server 415. The security application 103 illustrated in the previous figures may be part of the email application 410 and/or the on premise SMTP server 415.

Journaling is the ability to record emails for use in a company's email retention or archival strategy. A journal rule may be used to create a copy of an email in a separate mailbox. The technology described herein advantageously uses journaling to send a copy of an email to the email security server 420 for analysis. A connector is a collection of instructions that customize the way email flows to and from an email application 410. Taken together, the email application 410 may be used to configure a routing journal rule and a connector to automatically send copies of emails received by the email application 410 to the email security server 420. For example, the configuration may include modifying an ELB record or a DNS MX record.

The SMTP server 415 may receive emails and process the emails before routing copies of the emails to the email security server 420. The SMTP server 415 may add a routing header to route a copy of the email to the email security server 420.

The email security server 420 includes different possible flows for the copies of emails that are received from the customer email server 405.

The email security server 420 may include a journal submit 425 component. The journal submit 425 component may determine if a customer identifier is valid and configured. If the customer identifier is not valid and/or is not configured, the journal submit 425 component may create a notification that the copies of emails would be rejected in active mode. The journal submit 425 component may parse the email body for sender and recipient information, identify whether the email is an inbound email or an outbound email, and parse the email for a sender Internet Protocol (IP), DomainKeys Identified Mail (DKIM), Sender Policy Framework (SPF), and/or Domain Message Authentication, Reporting and Conformance (DMARC). The journal submit 425 component may perform checks on the email, such as an IP detection, a SPF check, a DKIM scan, a DMARC scan, and create a notification that describes emails that would be rejected because the emails are from blacklisted senders. The journal submit 425 component may determine whether an email violates various policies, whether certain licenses apply, removes certain types of headers (e.g., a transport route header, a bit defender response key header, a message history key header, etc.), adds new types of headers (e.g., a unique header, an authenticated receive header (ar header), etc.).

The journal submit 425 component may transmit the email to an archiving queue 430. In some embodiments, the archiving queue 430 archives the emails during active mode and does not archive the emails during monitor mode. The archiving queue 430 transmits the emails to the mail Product Integration Control (PIC) 440 for processing.

The mail PIC 440 may modify the journal reference header to skip delivery on notification emails that would be sent during active mode. Instead, the notifications may be included as part of a report prepared by the report module 465. The mail PIC 440 may perform services, redirect, a quarantine summary service, etc. The mail PIC 440 transmits the email to the successful delivery Simple Notification Service (SNS) 445, the quarantine 450 component, or the delete 455 component based on a determination of whether the email has suspicious content and a threat level associated with the email. For example, an email without suspicious content may be transmitted to the successful delivery SNS 445, an email that has suspicious content but may be released after a review by an administrator may be transmitted to the quarantine 450 component, and an email that has types of suspicious content that exceed a threshold threat level may be transmitted to the delete 455 component for deletion during active mode or reporting during monitor mode.

In this instance where the email security server 420 is reviewing emails in monitor mode, the customer delivery 460 component inactivates delivery of the email. For example, the customer delivery 460 component may modify the email header to route delivery of the email to null. If the email security server 420 was in active mode, the customer delivery 460 component may deliver the email to a recipient. In addition, during the monitor mode the successful delivery SNS 445, the quarantine 450 component, and the delete 455 component may provide information about emails to the report module 465.

The report module 465 generates a report about suspicious content (or absence of suspicious content) associated with the emails. For example, the report may include a message history, a message summary, an at-risk report that describes how risky the emails are, a Data Loss Prevention (DLP) report, and a license report. The report module 465 may send the report periodically (every hour, every day, etc.), after a predetermined number of emails are received (10 emails, 100 emails, etc.), or a metric that is defined by a customer.

Example User Interface 500

FIG. 5 is an example user interface 500 for configuring journal settings. The user interface 500 includes a field for specifying an email address 505 where journal reports are received by the customer. The user interface 500 also includes a field 510 for naming the journal rule name. In this case, the journal rule name is monitor mode. The user interface 500 includes radio buttons for specifying whether the journal messages are received 515 by everyone or a specific user or group. Lastly, the user interface 500 includes radio buttons for specifying a type of message to be analyzed 520, which includes all messages, internal messages only, or external messages only.

Example Method 600

FIG. 6 is a flow diagram of an example method 600 to determine whether an email is suspicious. The method 600 may be performed by a computing device 200 that includes a security application 103.

The method 600 may begin at block 602. At block 602, a first computing system implements a configuration of a routing journal rule and a connector to configure the first computing system to automatically send copies of inbound emails received at the first computing system to a second computing system. The second computing system is distinct from the first computing system. The second computing system includes a set of scanners operable to analyze the copies of the inbound emails to detect suspicious content.

Delivery of the inbound emails may be unaffected by sending copies of the inbound emails to the second computing system. This helps a customer to understand how the security application 103 may apply policy rules without affecting email delivery.

In some embodiments, the second computing system is specific to the first computing system and the second computing system includes an address associated with the first computing system in its network name. The copies of the inbound emails may include an additional header that includes information about the routing journal rule. Implementing the configuration to the routing journal rule and the connector may include modifying an ELB record or a DNS MX record.

In some embodiments, not all emails received by the first computer server are transmitted to the second computer server. The configuration may cause the first computing system to exclude at least one inbound email from inbound emails received at the first computing system from the copies being provided to the second computing system, based on a set of rules In addition to the inbound emails, the second computing system may be configured to receive copies of outbound emails and/or inbound emails generated by a user and analyze the copies of the outbound emails and/or the inbound emails for suspicious content. The method 600 may further include receiving a notification of the suspicious content in one of the outbound emails from the second computing system, wherein the notification is generated responsive to one or more of the set of scanners detecting at least a first email of the copies of outbound emails as including suspicious content. The configuration of the routing journal rule may include one or more options selected from the group of: specifying an email address that receives the copies of the inbound emails, specifying the email address that receives the copies of the outbound emails, specifying a sender of the inbound emails, specifying a type of message to receive, and combinations thereof. The method 600 may further include receiving a notification of the suspicious content in one of the internal emails from the second computing system, where the notification is generated responsive to one or more of the set of scanners detecting at least a second email of the copies of internal emails as including suspicious content.

In some embodiments, the configuration may include withholding delivery of the inbound emails until receiving the notification and the method may include if the notification indicates no suspicious content or permitted suspicious content, delivering the first email to a recipient inbox. Alternatively, if the notification indicates non-permitted suspicious content, withholding delivery of the at least the first email to the recipient inbox and sending an alert to an administrator of the first computing system.

In some embodiments, the method 600 may further include determining a threat level associated with the instance of suspicious content in the first email and responsive to the threat level exceeding a threshold threat level, removing the first email from an email inbox associated with a recipient of the first email. Block 602 may be followed by block 604.

At block 604, a notification of the suspicious content in a first email of the copies of inbound emails are received from the second computing system, wherein the notification is generated responsive to one or more of the set of scanners detecting at least the first email as including suspicious content. In some embodiments, notifying the first computing system of the suspicious content includes generating a report that summarizes the copies of the inbound emails during a particular time period, wherein the report includes one or more features selected from the group of an inbound email history, an inbound email summary, a description of suspicious files included in the copies of the inbound emails, a risk summary, a data loss prevention summary, a license summary, and combinations thereof.

In some embodiments, a customer may be satisfied with the security application and wants to switch from monitor mode to active mode. The method 600 may further include a request to implement an active mode that prevents delivery of a set of inbound emails with suspicious content and implementing, at the first computing system, the configuration of the routing journal rule and the connector to configure the first computing system to automatically to send the inbound emails to the set of scanners before delivering the inbound emails to the first computing system.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMS, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method to operate an email processing system, the method comprising:

configuring, at a first computing system comprising an email server, a a routing journal rule and a mail connector that cause the email server to, for each inbound email message received via a Simple Mail Transfer Protocol (SMTP) interface:

(a) generate a copy of the inbound email message and route the copy, using a routing header added by the email server, to a second computing system distinct from the first computing system, and (b) deliver the inbound email message to at least one recipient inbox without waiting for analysis of the copy of the inbound email message;

receiving, from the second computing system, an analysis result generated by executing one or more content scanners on the copy of the inbound email message, the analysis result indicating whether the inbound email message includes non-permitted suspicious content;

transmitting, based on the analysis result indicating the non-permitted suspicious content, an alert to an administrative interface associated with the first computing system;

in response to an administrative command received via the administrative interface, dynamically reconfiguring the routing journal rule and the mail connector such that subsequent inbound email messages are routed to the second computing system for content analysis prior to delivery to recipient inboxes;

receiving, for a subsequent inbound email message, a second analysis result from the second computing system indicating an absence of non-permitted suspicious content; and delivering the subsequent inbound email message to at least one recipient inbox responsive to the second analysis result.

2. The method of claim 1, wherein:

the second computing system is specific to the first computing system, and the second computing system includes an address associated with the first computing system in its network name.

3. The method of claim 1, wherein the administrative command received via the administrative interface is a request to switch from a monitor mode to an active mode to prevent delivery of subsequent inbound email messages with suspicious content.

4. The method of claim 1, wherein the one or more content scanners are associated with a respective type of content and are configured to detect whether the copy of the inbound email message includes the respective type of content.

5. The method of claim 1, wherein the second computing system is configured to receive copies of outbound email messages and analyze the copies of the outbound email messages for suspicious content, and the method further includes:

receiving a notification of the suspicious content in one of the outbound email messages from the second computing system, wherein the notification is generated responsive to the one or more content scanners detecting at least an outbound email message of the copies of the outbound email messages as including suspicious content.

6. The method of claim 5, wherein configuring the routing journal rule includes one or more options selected from a group of: specifying an email address that receives the copy of the inbound email message, specifying the email address that receives the copies of the outbound email messages, specifying a sender of the inbound email message, specifying a type of message to receive, and combinations thereof.

7. The method of claim 1, wherein the second computing system is configured to receive copies of internal email messages generated by a user and analyze the copies of the internal email messages for suspicious content, and the method further includes:

receiving a notification of the suspicious content in one of the internal email messages from the second computing system, wherein the notification is generated responsive to the one or more content scanners detecting at least an internal email message of the copies of the internal email messages as including suspicious content.

8. The method of claim 1, wherein delivery of the inbound email message is unaffected by routing the copy of the inbound email message to the second computing system.

9. The method of claim 1, further comprising:

removing, based on a subsequent administrative command received responsive to receiving the analysis result indicating the non-permitted suspicious content, the inbound email message from the at least one recipient inbox.

10. The method of claim 1, wherein configuring the routing journal rule and the mail connector includes modifying an Elastic Load Balancing (ELB) record or a Domain Name System (DNS) Mail Exchange (MX) record.

11. The method of claim 1, further comprising generating a report that summarizes copies of the inbound email messages during a particular time period, wherein the report includes one or more features selected from a group of an inbound email message history, an inbound email message summary, a description of suspicious files included in the copies of the inbound email messages, a risk summary, a data loss prevention summary, a license summary, and combinations thereof.

12. The method of claim 1, further comprising:

determining a threat level associated with an instance of suspicious content in a copy of a second inbound email message; and responsive to the threat level exceeding a threshold threat level, removing the second inbound email message from at least one second recipient inbox.

13. A first computing system that implements an email server, the first computing system comprising:

one or more processors; and one or more computer-readable media, coupled to the one or more processors and having instructions stored thereon that, when executed by the one or more processors, cause the one or more processors to perform operations comprising:

configuring, at the first computing system, a routing journal rule and a mail connector that cause the email server to, for each inbound email message received via a Simple Mail Transfer Protocol (SMTP) interface:

(a) generate a copy of the inbound email message and route the copy, using a routing header added by the email server, to a second computing system distinct from the first computing system, and (b) deliver the inbound email message to at least one recipient inbox without waiting for analysis of the copy of the inbound email message;

receiving, from the second computing system, an analysis result generated by executing one or more content scanners on the copy of the inbound email message, the analysis result indicating whether the inbound email message includes non-permitted suspicious content;

transmitting, based on the analysis result indicating the non-permitted suspicious content, an alert to an administrative interface associated with the first computing system;

in response to an administrative command received via the administrative interface, dynamically reconfiguring the routing journal rule and the mail connector such that subsequent inbound email messages are routed to the second computing system for content analysis prior to delivery to recipient inboxes;

receiving, for a subsequent inbound email message, a second analysis result from the second computing system indicating an absence of non-permitted suspicious content; and delivering the subsequent inbound email message to at least one recipient inbox responsive to the second analysis result.

14. The first computing system of claim 13, wherein the second computing system is specific to the first computing system and includes an address associated with the first computing system in its network name.

15. The first computing system of claim 13, wherein the second computing system is configured to receive copies of outbound email messages and analyze the copies of the outbound email messages for suspicious content, and the operations further include:

receiving a notification of the suspicious content in one of the outbound email messages from the second computing system, wherein the notification is generated responsive to the one or more content scanners detecting at least an outbound email message of the copies of the outbound email messages as including suspicious content.

16. A non-transitory computer-readable medium with instructions stored thereon that, responsive to execution by one or more processing devices, cause the one or more processing devices to perform operations comprising:

configuring, at a first computing system comprising an email server, a a routing journal rule and a mail connector that cause the email server to, for each inbound email message received via a Simple Mail Transfer Protocol (SMTP) interface:

(a) generate a copy of the inbound email message and route the copy, using a routing header added by the email server, to a second computing system distinct from the first computing system, and (b) deliver the inbound email message to at least one recipient inbox without waiting for analysis of the copy of the inbound email message;

receiving, from the second computing system, an analysis result generated by executing one or more content scanners on the copy of the inbound email message, the analysis result indicating whether the inbound email message includes non-permitted suspicious content;

transmitting, based on the analysis result indicating the non-permitted suspicious content, an alert to an administrative interface associated with the first computing system;

in response to an administrative command received via the administrative interface, dynamically reconfiguring the routing journal rule and the mail connector such that subsequent inbound email messages are routed to the second computing system for content analysis prior to delivery to recipient inboxes;

receiving, for a subsequent inbound email message, a second analysis result from the second computing system indicating an absence of non-permitted suspicious content; and delivering the subsequent inbound email message to at least one recipient inbox responsive to the second analysis result.

17. The non-transitory computer-readable medium of claim 16, wherein the second computing system is specific to the first computing system and includes an address associated with the first computing system in its network name.

18. The non-transitory computer-readable medium of claim 16, wherein the second computing system is configured to receive copies of outbound email messages and analyze the copies of the outbound email messages for suspicious content, and the operations further include:

receiving a notification of the suspicious content in one of the outbound email messages from the second computing system, wherein the notification is generated responsive to the one or more content scanners detecting at least an outbound email message of the copies of the outbound email messages as including suspicious content.

19. The non-transitory computer-readable medium of claim 16, wherein the administrative command received via the administrative interface is a request to switch from a monitor mode to an active mode to prevent delivery of subsequent inbound email messages with suspicious content.

20. The non-transitory computer-readable medium of claim 16, wherein the operations further include generating a report that summarizes copies of the inbound email messages during a particular time period, wherein the report includes one or more features selected from a group of an inbound email message history, an inbound email message summary, a description of suspicious files included in the copies of the inbound email messages, a risk summary, a data loss prevention summary, a license summary, and combinations thereof.

* * * * *